_United States Patent Office_ 3,329,689
Patented July 4, 1967

3,329,689
PREPARATION OF CHROMANOLS
Karl Folkers and Harold W. Moore, Menlo Park, Calif., assignors, by mesne assignments, to Merck & Co., Inc., Rahway, N.J., a corporation of New Jersey
No Drawing. Filed June 5, 1964, Ser. No. 373,071
14 Claims. (Cl. 260—345.2)

This invention relates to the conversion of quinones to the corresponding chromanols. More particularly, it is concerned with a process for the conversion of quinones of the coenzyme Q, vitamin E and vitamin K series to the corresponding chromanol compounds.

The chromanols obtained in accordance with the process of this invention are valuable compounds useful as antitoxidants for various foodstuffs such as oils and fats. The presently available methods for the preparation of these chromanols are difficult to carry out on a commercial scale and result in only small yields of the desired product. One problem associated with the preparation of chromanols from quinones having polyunsaturated polyisoprene side chains is the concomitant cyclization of the side chain. For example, this problem is extremely troublesome in the conversion of coenzyme $Q_{10}$ to its chromanol. Accordingly, other methods of preparing chromanols which would avoid these difficulties have been sought.

It is an object of this invention to provide a convenient process for converting quinones of the coenzyme Q, vitamin E and vitamin K series to the corresponding chromanols. Other objects will be apparent from the detailed description of this invention hereinafter provided.

In accordance with the present invention, it is now found that quinones of the coenzyme Q, vitamin E and vitamin K series can be conveniently converted to the corresponding chromanols by reaction with an enediol compound in the presence of an iron or copper salt. This reaction can be shown as follows:

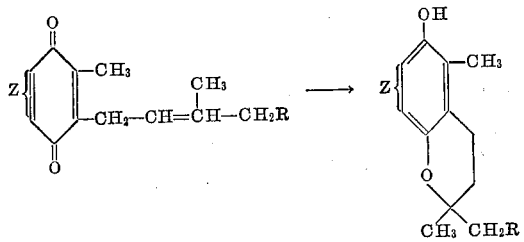

wherein Z is

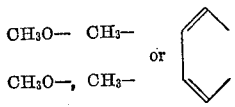

and R is hydrogen,

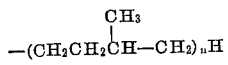

or

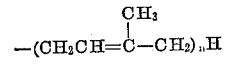

where $n$ is an integer from 1 to 9.

The reaction is effected by intimately contacting the quinone with the enediol compound in the presence of an iron or copper salt for sufficient time to convert the quinone to the corresponding chromanol. It is most conveniently carried out by dissolving the reactants in a suitable solvent medium, for example, glacial acetic acid, formic acid, dimethoxyethane and the like, and heating the reaction mixture under reflux for sufficient time to complete the formation of the chromanol.

Compounds containing an enediol group, i.e.,

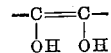

such as ascorbic acid, isoascorbic acid, reductone, dihydroxymaleic anhydride, glucoascorbic acid and the like, can be used in effecting the process of this invention. Generally, it is preferred to use ascorbic acid or isoascorbic acid as the enediol compound since these compounds or readily available and their use results in maximum yields of the desired product under optimum conditions. The amount of enediol compound is not critical but it is preferred to use at least about 5 moles per mole of quinone, in order to insure that there is sufficient present to complete the conversion of the quinone to the chromanol.

Various salts of copper and iron can be used as catalysts in carrying out this new process. Generally, it is preferred to utilize cupric and ferric salts, such as cupric chloride, ferric chloride, cupric acetate, ferric acetate, and the like, for this purpose. While the amount of salt is not critical, it is preferred to use 1 mole for each mole of quinone reacted, since under these conditions maximum yields of the desired chromanol can be obtained.

After completion of the reaction, the desired chromanol can be recovered in accordance with procedures well known in this art. Thus, the chromanol is conveniently obtained by diluting the reaction mixture with water and extracting the product with a suitable water-immiscible solvent. Evaporation of the resulting solvent extract yields the desired chromanol.

The following examples are presented to illustrate methods of carrying out the present invention.

EXAMPLE 1

*Preparation of 2,5 - dimethyl - 2 - (4',8',12',16',14',28', 32',36' - nonamethylheptatricontanyl) - 6 - hydroxy-7, 8-dimethoxychroman*

A solution of 10 g. (0.00116 moles) of coenzyme $Q_{10}$, 1.10 g. (0.0063 moles) of L-ascorbic acid, and 300 mg. of $CuCl_2 \cdot 2H_2O$ in 100 ml. of glacial acetic acid is slowly heated to reflux temperature. Thin layer chromatography (silica gel G) on the reaction mixture 15 minutes after adding the reactants shows a spot corresponding to the starting quinone, and a faint spot (detected by the Emerie-Engle reagent) corresponding to the hydroquinone of coenzyme $Q_{10}$. By the time the reflux temperature is reached, thin layer chromatography shows a decrease in quinone, and an increase in hydroquinone concentration, and the appearance of another spot (also giving a positive test with Emerie-Engle reagent) with an $R_f$ value greater than either the hydroquinone or the quinone. The reaction mixture is refluxed for 1.5 hours and the reaction is closely followed by thin layer chromatography. The reaction is stopped as soon as the spot corresponding to the hydroquinone of coenzyme $Q_{10}$ has disappeared. At this point, thin layer chromatography shows the spot, previously described ($R_f$ greater than coenzyme $Q_{10}$ or the hydroquinone of $Q_{10}$), and several spots near the origin of the plate.

The reaction mixture is poured into 500 ml. of distilled water and the resulting mixture is extracted four times with redistilled n-hexane. The combined n-hexane solution is then washed twice with distilled water, twice with 10% sodium bicarbonate, and again twice with distilled water. The n-hexane solution is then dried over anhydrous sodium sulfate and concentrated in vacuo. A light yellow viscous oil (0.75 g.) is collected. A pure sample of 2,5-dimethyl-2-(4',8', 12', 16', 20', 24', 28', 32', 36'-nonamethylheptatricantamyl) - 6 - hydroxy - 7,8 - dimethoxychroman is collected by thin layer chromatography on a 0.3 mm. silica gel G plate with 30% ether in n-hexane.

Under these conditions, an $R_f$ value of 0.44 is observed. Coenzyme $Q_{10}$ under these conditions gives an $R_f$ of 0.41.

The infrared absorption spectrum of the chromanol product is very similar to the spectrum obtained from a sample of the chromanol of hexahydrocoenzyme $Q_4$. The major absorption bands in the spectrum are 3480 cm.$^{-1}$ (OH), 2900 cm.$^{-1}$ (C—H stretching), 1450 cm.$^{-1}$ (C—H— deformation), 1170 cm.$^{-1}$ and 1190 cm.$^{-1}$ (C—O—$CH_3$). The nuclear magnetic resonance spectrum is also in agreement with a chroman ring system. The observed bands and their assignment in carbon tetrachloride solution are tabulated below.

| Tau: | Assignment |
| --- | --- |
| 4.88 | OH |
| 4.99 | H—C= |
| 6.16 | —$OCH_3$ |
| 6.28 | —$OCH_3$ |
| 7.48 triplet | —$CH_2$—C= |
| 8.01–9.1—Saturated alkyl groups. | |

EXAMPLE 2

*Preparation of 7,8-dimethoxy-2,5-dimethyl-2-(4′,8′,12′-trimethyltridecyl)-6-chromanol*

A solution of 500 mg. (1.03 mmoles) of 2,3-dimethoxy - 5 - phytyl - 6 - methyl - 1,4 - benzoquinone (hexahydrocoenzyme- $Q_4$), 906 mg. (5.15 mmoles) of L ascorbic acid, and 300 mg. of cupric chloride dihydrate in 50 ml. of glacial acetic acid is heated slowly to the reflux temperature. By the time the reflux temperature is reached, the color of the reaction mixture has changed from orange to brown. This solution is refluxed for approximately two hours. During this period the course of the reaction is followed by thin layer chromatography (silica gel G developed in 18% ether in hexane). The chromatogram shows a gradual disappearance of the quinone and a simultaneous appearance of a spot corresponding to the chromanol of hexahydrocoenzyme $Q_4$. The dark brown reaction mixture is poured into two volumes of distilled water and then two volumes of redistilled n-hexane are added. After extraction, the hexane layer is collected and the aqueous layer is washed twice with n-hexane. The combined n-hexane solution is washed twice with distilled water, twice with 10% sodium bicarbonate, and again twice with distilled water. The n-hexane solution is then dried over anhydrous sodium sulfate. A thin layer chromatogram of the n-hexane solution is then taken against a standard sample of the chromanol of hexahydrocoenzyme $Q_4$. The chromatogram plate is 0.3 mm. silica gel G and the developing solvent is 30% ether in hexane. The reaction mixture (n-hexane solution) shows only one spot which corresponds exactly to the spot given by hexahydrocoenzyme $Q_4$. The spots are detected by 2% aqueous potassium permanganate and also the Emerie-Engle reagent.

The n-hexane solution is concentrated in vacuo. A viscous yellow-brown residual oil is then collected). This product weighs 500 mg. (quantitative conversion). The infrared, ultraviolet, and nuclear magnetic resonance spectra of the product are identical in all respects to the corresponding spectra obtained from an authentic sample, of 7,8 - dimethoxy - 2,5 - dimethyl - 2 - (4′,8′,12′-trimethyltridecyl)-6-chromanol.

EXAMPLE 3

*Preparation of 2,3-dimethoxy-5-phytyl-6-methyl-1,4-benzoquinone*

A solution of 700 mg. (1.5 mmoles) of 2,3-dimethoxy-5 - phytyl - 6 - methyl - 1,4 - benzoquinone (hexahydrocoenzyme $Q_4$), 1300 mg. (7.4 mmoles) of L-ascorbic acid, and 500 mg. of cupric acetate in 50 ml. of glacial acetic acid is slowly heated to the reflux temperature. The resulting deep green solution is refluxed for one hour. A thin layer chromatogram of the reaction mixture at the end of this time shows one major spot which corresponds exactly to a spot produced by an authentic sample of 2,3-dimethoxy - 5 - phytyl - 6 - methyl - 1,4 - benzohydroquinone. The reaction mixture is refluxed for an additional three hours. Thin layer chromatography shows the presence of the chromanol of hexahydrocoenzyme $Q_4$.

EXAMPLE 4

*Preparation of α-tocopherol*

A solution of 198 mg. (0.46 mmoles) of 2,3,6-trimethyl-5-phytyl-1,4-benzoquinone, 406 mg. (2.31 mmoles) of L-ascorbic acid, and 106.7 mg. of $CuCl_2 \cdot 2H_2O$ in 26 ml. of glacial acetic acid is warmed slowly to the reflux temperature. This solution is refluxed for four hours. At the end of this time, thin layer chromatography on silica gel G (developed in 20% ether in hexane) shows only one spot. The $R_f$ value of this spot corresponds exactly to that of α-tocopherol or to that of 2,3,6-trimethyl-6-phytyl-1,4-benzohydroquinone. The reaction mixture is poured into water and two volumes of redistilled n-hexane are added. The combined n-hexane solution is then washed twice with distilled water. This solution is then dried over anhydrous sodium sulfate and then concentrated in vacuo. A viscous yellow-brown oil weighing 191 mg. (97% yield) is collected. A thin layer chromatogram of this oil is run against a standard sample of dl-α-tocpherol. The plate is 0.3 mm. silica gel G developed in 20% ether in hexane. The spots are detected by spraying the plate with either a 2% aqueous solution of potassium permanganate or with the Emerie-Engle reagent. Only one spot is detected and this spot corresponds exactly with that obtained from the standard dl-α-tocopherol sample. An infrared absorption spectrum of the product is identical to a spectrum obtained from an authentic sample of dl-α-tocopherol.

EXAMPLE 5

*Preparation of chromanol of vitamin $K_{1(20)}$*

A solution of 58 mg. (0.1 mmole) of vitamin $K_{1(20)}$, 89 mg. (0.5 moles) of L-ascorbic acid, and 20 mg. of $CuCl_2 \cdot 2H_2O$ in 25 ml. of glacial acetic acid is warmed to reflux temperature. This solution is refluxed for approximately two hours. At the end of this time, thin layer chromatography on silica gel G shows the presence of the chromanol of vitamin $K_{1(20)}$. This material is identified by comparison with an authentic sample.

EXAMPLE 6

*Preparation of coenzyme $Q_4$ chromanol*

A solution of 50 mg. of coenzyme $Q_4$, 90 mg. of L-ascorbic acid, and 30 mg. of $FeCl_3$ in 25 ml. of glacial acetic acid is slowly heated to the reflux temperature. After about thirty minutes the color of the reaction mixture has changed from orange to light yellow. A thin layer chromatogram on the reaction mixture shows only one spot above the origin. This spot is detected by the Emerie-Engle reagent and shows an $R_f$ value identical to that obtained from an authentic sample of the chromanol of hexahydrocoenzyme $Q_4$, 7,8-dimethoxy-2,5-dimethyl-2-(4′,8′,12′-trimethyltridecyl)-6-chromanol. The reaction mixture is poured into two volumes of distilled water and then two volumes of n-hexane is added. After extraction, the hexane layer is collected and the aqueous layer is washed twice with distilled water, twice with 10% sodium bicarbonate and again twice with distilled water. The n-hexane solution is then dried over anhydrous sodium sulfate. The solvent is removed in vacuo leaving the chromanol as a viscous yellow oil. The NMR, IR and UV spectra of this oil are in strict agreement with the structure of the chromanol of hexahydrocoenzyme $Q_4$.

EXAMPLE 7

*Preparation of coenzyme $Q_{10}$ chromanol*

A solution of 50 mg. of coenzyme $Q_{10}$, 90 mg. of L- ascorbic acid, and 20 mg. of $FeCl_3$ in 30 ml. of glacial acetic acid is slowly heated to reflux temperature. The reaction is followed by thin layer chromatography on silica gel G (30% ether in hexane). After a few minutes an Emerie-Engle sensitive spot is detected at an $R_f$ value identical to the $R_f$ value obtained from the coenzyme $Q_{10}$ chromanol shown in Example 1.

EXAMPLE 8

*Preparation of hexahydrocoenzyme $Q_4$ chromanol*

A solution of 50 mg. of hexahydrocoenzyme $Q_4$, 90 mg. of L-ascorbic acid, and 30 mg. of cupric acetate in 25 ml. of formic acid is slowly warmed to the reflux temperature. After approximately 30 minutes, the color of the reaction mixture has changed from yellow-orange to light green. A thin layer chromatogram (silica gel G; 0.3 mm. thickness in 30% ether in n-hexane) of the reaction solution shows only one spot above the origin (detected by the Emerie-Engle reagent). This spot corresponds exactly in $R_f$ value to a spot obtained from an authentic sample of the chromanol of coenzyme $Q_4$.

EXAMPLE 9

*Preparation of hexahydrocoenzyme $Q_4$ chromanol*

The reaction is run exactly analogous to that described for the conversion of the quinone to the chromanol in dimethoxyethane. As usual, reduction to the hydroquinone is readily accomplished. After 20 hours of refluxing, about 25% of the hydroquinone has been converted to the chromanol.

EXAMPLE 10

*Preparation of hexahydrocoenzyme $Q_4$ chromanol*

A solution of 50 mg. of coenzyme $Q_4$, 90 mg. of L-ascorbic acid and 30 mg. of ferric chloride in 25 ml. of dimethoxyethane is refluxed for 18 hours. During this period of time the reaction is followed by thin layer chromatography on silica gel G (30% ether in n-hexane). After about 1 hour of refluxing, the chromatogram indicates a complete conversion to the hydroquinone of hexahydrocoenzyme $Q_4$. Upon further heating, another Emerie-Engle sensitive spot appears which corresponds to the $R_f$ value identical to that obtained from an authentic sample of the chromanol of hexahydrocoenzyme $Q_4$. After the 18 hour reflux period, the TLC chromatograms show complete conversion to the chromanol.

Various changes and modifications of the invention can be made and, to the extent that such variations incorporate the spirit of this invention, they are intended to be included within the scope of the appended claims.

What is claimed is:

1. A process for the preparation of chromanols which comprises reacting a quinone of the formula:

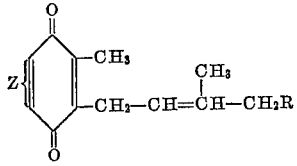

wherein Z is a member from the group consisting of

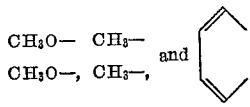

and R is a member from the group consisting of hydrogen, $$-(CH_2CH_2\overset{CH_3}{\underset{|}{C}}H-CH_2)_nH \text{ and } -(CH_2CH=\overset{CH_3}{\underset{|}{C}}-CH_2)_nH$$

wherein $n$ is an integer from 1 to 9 with a compound containing an enediol group in the presence of a metal ion from the group consisting of copper and iron to produce the corresponding chromanol of the formula:

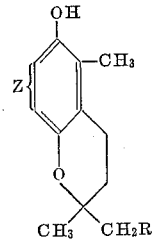

wherein Z and R are the same as above.

2. The process of claim 1 wherein ascorbic acid is used as the compound containing the enediol group.

3. The process of claim 1 wherein isoascorbic acid is used as the compound containing the enediol group.

4. The process of claim 1 wherein the source of metal ion is copper chloride.

5. The process of claim 1 wherein the source of metal ion is ferric chloride.

6. A process which comprises reacting coenzyme $Q_{10}$ with L-ascorbic acid in the presence of cupric chloride to produce the corresponding coenzyme $Q_{10}$ chromanol.

7. A process which comprises reacting hexahydrocoenzyme $Q_4$ with L-ascorbic acid in the presence of cupric chloride to produce the corresponding chromanol.

8. A process which comprises reacting hexahydrocoenzyme $Q_4$ with L-ascorbic acid in the presence of copper acetate to produce the corresponding chromanol.

9. A process which comprises reacting 2,3,6-trimethyl-5-phytol-1,4-benzoquinone with L-ascorbic acid in the presence of cupric chloride to produce the corresponding chromanol.

10. A process which comprises reacting vitamin $K_{1(20)}$ with L-ascorbic acid in the presence of cupric chloride to produce the corresponding chromanol.

11. A process which comprises reacting coenzyme $Q_4$ with L-ascorbic acid in the presence of ferric chloride to produce the corresponding chromanol.

12. A process which comprises reacting coenzyme $Q_{10}$ with L-ascorbic acid in the presence of ferric chloride to produce the corresponding chromanol.

13. A process which comprises reacting hexahydrocoenzyme $Q_4$ with L-ascorbic acid in the presence of copper acetate to produce the corresponding chromanol.

14. A process which comprises reacting coenzyme $Q_4$ with L-ascorbic acid in the presence of ferric chloride to produce the corresponding chromanol.

References Cited

UNITED STATES PATENTS

| | | | |
|---|---|---|---|
| 3,064,012 | 11/1962 | Folkers et al. | 260—345.5 |
| 3,118,914 | 1/1964 | Gloor et al. | 260—345.5 X |
| 3,154,565 | 10/1964 | Linn et al. | 260—345.2 |

WALTER A. MODANCE, *Primary Examiner.*

JOHN M. FORD, *Assistant Examiner.*

UNITED STATES PATENT OFFICE
CERTIFICATE OF CORRECTION

Patent No. 3,329,689　　　　　　　　　　　　　　　July 4, 1967

Karl Folkers et al.

It is hereby certified that error appears in the above numbered patent requiring correction and that the said Letters Patent should read as corrected below.

Column 6, lines 2 to 4, the second formula should appear as shown below instead of as in the patent:

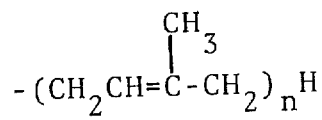

Signed and sealed this 29th day of October 1968.

(SEAL)
Attest:

Edward M. Fletcher, Jr.
Attesting Officer

EDWARD J. BRENNER
Commissioner of Patents